United States Patent [19]

Tabata et al.

[11] 3,892,641

[45] July 1, 1975

[54] PROCESS FOR PRODUCING A COPOLYMER OF TETRAFLUOROETHYLENE AND PROPYLENE

[75] Inventors: Yoneho Tabata; Hiroshi Ukihashi, both of Tokyo; Masaaki Yamabe, Yokohama, all of Japan

[73] Assignees: Japan Atomic Energy Research Institute; Asahi Glass Company, Japan

[22] Filed: Apr. 10, 1973

[21] Appl. No.: 349,680

Related U.S. Application Data

[63] Continuation-in-part of Ser. No. 147,209, May 26, 1971, abandoned.

[30] Foreign Application Priority Data

May 26, 1970 Japan.............................. 45-44507

[52] U.S. Cl..... 204/159.22; 260/33.2 R; 260/42.27; 260/87.5 B
[51] Int. Cl. ............................................. C08f 1/16

[58] Field of Search............ 260/87.5 B; 204/159.22

[56] References Cited

UNITED STATES PATENTS

| 2,559,752 | 7/1951 | Berry................................ 260/29.6 |
| 3,467,635 | 9/1969 | Brasen et al...................... 260/80.76 |
| 3,723,270 | 3/1973 | Tabata et al..................... 204/159.22 |

FOREIGN PATENTS OR APPLICATIONS

| 42-24,179 | 11/1967 | Japan |
| 43-4,866 | 2/1968 | Japan |
| 43-12,817 | 5/1968 | Japan |

*Primary Examiner*—Stanford M. Levin
*Attorney, Agent, or Firm*—Oblon, Fisher, Spivak, McClelland & Maier

[57] ABSTRACT

High molecular weight copolymers of tetrafluoroethylene and propylene are prepared by a radiation-induced emulsion copolymerization process in the absence of a hydrocarbon liquid.

7 Claims, No Drawings

PROCESS FOR PRODUCING A COPOLYMER OF TETRAFLUOROETHYLENE AND PROPYLENE

CROSS REFERENCES TO RELATED APPLICATIONS

This application is a continuation-in-part of Ser. No. 147,209 filed May 26, 1971, now abandoned.

BACKGROUND OF THE INVENTION

1. Field Of The Invention

This invention relates to a process for producing a copolymer of tetrafluoroethylene and propylene, and more particularly to a process for producing a high molecular weight copolymer of tetrafluoroethylene and propylene by emulsion copolymerization of tetrafluoroethylene and propylene with high energy ionizing radiation in an aqueous medium containing a dispersing agent.

2. Description Of Prior Art

It has been known to produce copolymers of tetrafluoroethylene and propylene by suspension copolymerization of tetrafluoroethylene and propylene in the presence of an organic peroxide catalyst, as disclosed in British Pat. Specification No. 594,249, or by emulsion copolymerization of tetrafluoroethylene and propylene in the presence of a water soluble catalyst, as disclosed in U.S. Pat. No. 3,467,635. These prior art processes, however, have the disadvantage of requiring high pressures, about 150 kg/cm$^2$, which necessitates the use of complex and heavy equipment. In accordance with these conventional processes using a catalyst, only copolymers having relatively low molecular weights of up to 60,000 could be obtained. Moreover, in these conventional emulsion copolymerization systems, it was necessary to admix a buffering agent and/or other additives to the reaction system, in order to maintain the activity of polymerization initiator.

These buffering agents and/or other additives, however, were undesirable in that they tended to remain in the resulting copolymer and were difficult to remove completely by washing. The presence of the impurities remarkably decreased the heat resistance of the copolymer of tetrafluoroethylene and propylene.

It has also been known to produce copolymers of tetrafluoroethylene and propylene with high energy ionizing radiation, (see Kogyo Kagaku Zasshi 68 (10) 1926-9), to produce a pure product. However, that process also had the disadvantage of a slow polymerization reaction rate, e.g., as low as 0.1% per hour, and a low degree of polymerization. Furthermore, it was quite difficult to remove the heat of reaction from that process, so that it is not commercially feasible. In order to resolve these disadvantages, it has been considered to copolymerize the tetrafluoroethylene and propylene in a suitable organic solvent with high energy ionizing radiation (as disclosed in copending application Ser. No. 97,386, filed Dec. 11, 1970, now U.S. Pat. No. 3,723,270). However, the molecular weight of the resultant copolymers was found to be still too low, on the order of 40,000 - 50,000.

It has been known that various fluoroolefins, such as tetrafluoroethylene, trifluorochloroethylene and hexafluoropropylene have, respectively, been emulsion-polymerized in an aqueous medium containing a dispersing agent, with high energy ionizing radiation, (in Japanese Patent Publication 24179/1967, Japanese Patent Publication 4866/1968, and Japanese Patent Publication 12817/1968).

In those conventional radiation-induced emulsion polymerization processes, however, a vapor phase polymerization reaction can easily occur to yield unfavorable results. In order to prevent such a disadvantageous vapor phase polymerization reaction, it was necessary to add a hydrocarbon liquid to the reaction system. However, the hydrocarbon liquid usually affected the reaction as a chain transfer agent, whereby the molecular weight of resultant polymer was decreased. Moreover, it was also difficult to completely remove the hydrocarbon liquid from the resulting polymer by washing, so that the heat resistance of the polymer was decreased. In these conventional processes, it was difficult to obtain a copolymer having a high molecular weight and also it was difficult to control the molecular weight of the copolymer product, or to produce a copolymer of tetrafluoroethylene-propylene having suitable cross-linkage. For example, the tetrafluoroethylene and propylene copolymer of U.S. Pat. No. 3,467,635 has a tensile strength of only 60 kg/cm$^2$, even though the copolymer is cross-linked and hence is not suitable for industrial use.

SUMMARY OF THE INVENTION

Accordingly, it is one object of this invention to provide a novel process for producing a high molecular weight copolymer of tetrafluoroethylene and propylene at sufficiently high copolymerization reaction rates.

It is another object of this invention to provide a novel process for producing a pure high molecular weight copolymer of tetrafluoroethylene and propylene at sufficiently high copolymerization reaction rates.

It is another object of this invention to provide a process for producing a pure high molecular weight copolymer of tetrafluoroethylene and propylene under relatively low pressures.

It is a further object of this invention to provide a process for producing a copolymer of tetrafluoroethylene and propylene having a controlled high molecular weight, which can be converted to a cross-linked copolymer of high strength, which is suitable for industrial purposes.

It is a still further object of this invention to provide a process for producing a copolymer of tetrafluoroethylene and propylene using high energy ionizing radiation whereby the degree of vapor phase polymerization reaction is reduced.

These and other objects have now herein been attained by irradiating a mixture of tetrafuoroethylene and propylene with high energy ionizing radiation in an aqueous medium containing a suitable dispersing agent, which is suitable for emulsifying tetrafluoroethylene and propylene and which has no retarding action on the copolymerization reaction, in the absence of a hydrocarbon liquid at a reaction temperature of 5° - 80°C and pressure of 1 - 50 kg/cm$^2$. One example of a suitable dispersing agent used in this invention are the perfluoro type dispersing agents.

DESCRIPTION OF THE PREFERRED EMBODIMENTS

The molar ratio of tetrafluoroethylene to propylene can be selected over a wide range. For instance, suitable results are attainable when the molar ratio of tetrafluoroethylene/propylene is from 99/1 to 1/99, preferably 95/5 to 30/70, especially 95/5 to 50/50. The degree of polymerization and the particular composition of the copolymer, of course, will depend upon the particular molar ratios of the tetrafluoroethylene used, especially when higher concentrations of tetrafluoroethylene are used. The molecular weight of the resulting copolymers has been found to be sufficiently high and the copolymerization reaction rate has been found to be suitable for industrial purposes. It is desirable to use low molar ratios of tetrafluoroethylene, in order to decrease the extent of the vapor phase polymerization reaction.

It is possible to copolymerize other compatible comonomers, to the extent that the advantages of the combination of tetrafluoroethylene and propylene are not lost in the process of this invention. For example, it is possible to copolymerize tetrafluoroethylene, propylene and a small amount of such comonomers as fluoroolefins, ethylene and isobutylene. It is also possible to copolymerize tetrafluoroethylene, propylene and a small amount of comonomer for providing sites for cross-linking, such as acrylic acid and chloroethylvinylethers, where a cross-linkable copolymer of tetrafluoroethylene and propylene is required.

The dispersing agent used in the process of this invention is suitable for emulsifying tetrafluoroethylene and propylene and has no retarding action for the copolymerization reaction. The typical dispersing agents include the water soluble salts of perfluoro aliphatic carboxylic acid, and water soluble salts of phosphoric esters of perfluoro aliphatic alcohol, and perfluorosulfates and perfluorochlorosulfates.

A dispersing agent having a small retarding action may also be added for dispersing propylene, such as water soluble salts of alkyl sulfates, alkylaryl sulfonates and nonionic surfactants. However, it is not suitable to add such a dispersing agent for the copolymerization reaction. The dispersing agent may be used in the process in amounts of between 0.0001 – 10 and especially 0.001 – 5 percent by weight of aqueous medium.

Any type of high energy ionizing radiation can be used to effect the copolymerization reaction. For instance, $\gamma$-rays, X-rays, $\alpha$-rays, $\beta$-rays, or electron rays may be used. It is possible to use any type of ionizing radiation ray source, such as radioactive elements of cobalt 60 and cesium 137, an atomic reactor, a charged particle accelerator or an X-ray generator. In general, $\gamma$-rays from cobalt 60 is preferably used.

The dose rate of the ionizing radiation may be between $10^2 - 10^7$ roentgens per hour, and preferably $10^3 - 10^6$ roentgens per hour. In general, when a high dose rate is used, the copolymerization reaction rate will be high, but the molecular weight of the resultant copolymer will be low. Where the total dose is too small, the conversion to the copolymer will be decreased, and the yield of copolymer will be decreased. Accordingly, it is preferable to use the total dose of $10^2 - 10^8$ roentgens, and especially $10^3 - 5 \times 10^7$ roentgens.

Various additives may also be added such as those used in conventional emulsion polymerization systems, such as stabilizers, e.g., trifluorotrichloroethane, t-butanol, and chlorohydrocarbons; water soluble reaction initiators, e.g., ammonium persulfate, potassium persulfate and azo compounds. However, it is possible to prevent additive contamination of the resultant copolymer, using the techniques of this invention.

The temperature of the copolymerization reaction is not critical and can be carried out within the range of from 0°C to 100°C, and preferably 5°C to 80°C. The pressure of the reaction can be lower than those of conventional processes. The pressure is preferably from 1 to 50 kg/cm².

In accordance with this invention, the emulsion copolymerization can be advantageously made without high reaction pressures. However, it is possible to copolymerize in either high pressure systems or low pressures, using the techniques of this invention. The processes of this invention can be effected continuously or bacthwise.

In accordance with this invention, copolymers of tetrafluoroethylene and propylene having high molecular weights sufficient to provide excellent properties subsequent to cross-linking can be easily produced by selecting the appropriate dose rate of ionizing radiation, the reaction temperature and the pressure, without the use of a molecular weight regulator or the use of high reaction pressure. It is possible to produce copolymers of tetrafluoroethylene and propylene having molecular weights of more than 60,000, i.e., molecular weights of 70,000 – 100,000.

The copolymers produced by the process of this invention can be converted by various cross-linking means, to obtain the cross-linked copolymer of a tensile strength of about 100 kg/cm² or more.

According to the process of this invention, the tetrafluoroethylene and propylene copolymer can be obtained in the form of a latex dispersion of the copolymer in an aqueous medium. The copolymer can then be separated from the aqueous medium by well-known conventional processes for coagulating the copolymer from said latex and it has been found that such copolymers are characterized by high elasticity.

The separated copolymer can be cross-linked by a cross-linking agent, such as an organic peroxide, or a multi-valent amine compound, etc. to provide a rubber-like product. It is also possible to cross-link the copolymer by irradiation using high energy ionizing radiation, such as $\gamma$-ray, electron beam, etc. In the latter case, the copolymer can be partially cross-linked by application of appropriate doses of ionizing radioactive rays to the resultant latex without separating the copolymer.

When the tetrafluoroethylene and propylene copolymer produced in accordance with the process of this invention has been converted into a cross-linked copolymer, it has been found that it possesses excellent mechanical strength and other properties which are difficult to obtain by ordinary conventional processes.

Having generally described the invention, a further understanding can be attained by reference to certain specific Examples which are provided herein for purposes of illustration only and are not intended to be limiting in any manner.

EXAMPLE 1

200 g. of water from which oxygen has been removed and 0.40 g. of an ammonium salt of perfluorooctanoic acid were charged into an autoclave made of stainless steel and having a volume of 500 ml. The air was removed by repeated solidiying and evacuating, and 25.0 g. of tetrafluoroethylene and 5.25 g. of propylene were charged. $\gamma$-rays from a source of cobalt 60 was irradiated to the mixture at 28°C. while stirring at 750 rpm., at a dose rate of 3.3 × 10⁴ roentgens/hour for 16.8 hours. The pressure in the copolymerization reaction system was decreased from 16 kg/cm² to 10 kg/cm².

After the copolymerization reaction, unreacted monomers were discharged from the system, and a latex containing 5% of the copolymer of tetrafluoroethylene and propylene was obtained. The polymerization reaction rate was 2.1%/hr. The latex was frozen and coagulated to yield 101 g. of rubber-like copolymer elastomer, which is soluble in tetrahydrofuran and trichlorotrifluoroethane. The intrinsic viscosity of the copolymer in tetrahydrofuran solution (100 cc/g) at 30°C was 0.44.

EXAMPLES 2 – 4

10 g. of water from which oxygen has been removed and 20 mg. of ammonium salt of perfluorooctanonic acid were charged into an autoclave made of stainless steel and having a volume of 50 ml. The additives shown in Table 1 were respectively added thereto. The air was removed by repeated solidifying and evacuating and the monomers shown in Table 1 were respectively charged under pressure. γ-rays from a source of cobalt 60 was irradiated to the mixture at room temperature, while stirring, at a dose rate of 3.3 × 10⁴ roentgens/hour for 10 hours. The results are shown in Table 1.

TABLE 1

| | Additives | Monomer | | Concentration of Latex | Conversion for Latex | THF [η] 30°C |
|---|---|---|---|---|---|---|
| | | $C_2F_4$ | $C_3H_6$ | | | |
| Example 2 | $CF_2ClCCl_2F$ 2.0 g. | 2.53 g. | 0.53 g. | 3.3% | 95% | 0.41 |
| Example 3 | t-BuOH 2.0 g. | 2.38 g. | 0.50 g. | 4.6% | 93% | 0.54 |
| Example 4 | $CF_2ClCCl_2F$ 2.0 g. | 2.99 g. | 0.12 g. | 19.6% | 62% | 0.82 |

Reference:

The copolymer of tetrafluoroethylene and propylene of Example 1 was cross-linked to yield a corss-linked copolymer of 97 kg/cm² of tensile strength and 750% of elongation. Only about 5% of weight loss was found by heating the resultant cross-linked copolymer at 260°C for 400 hours.

EXAMPLE 5

10 g. of water from which oxygen has been removed and 20 g. of ammonium salt of perfluorooctanonic acid were charged into an autoclave made of stainless steel and having a volume of 50 ml. The air was removed and 2.60 g. of tetrafluoroethylene and 0.55 g. of propylene were charged under pressure. γ-rays from a source of cobalt 60 was irradiated to the mixture at room temperature while stirring, at a dose rate of 3.3 × 10⁴ roentgen/hour for 10 hours. As the result, the conversion was 69% and 4 weight percent of an aqueous latex solution was obtained.

EXAMPLE 6

The process of Example 4 was repeated except using t-BuOH instead of $CF_2ClCCl_2F$. Where the emulsion polymerization is made by irradiating γ-ray, the conversion to latex was 69% and 6 weight percent of latex aqueous solution was obtained.

EXAMPLE 7

2.1 of water from which oxygen has been removed and 60 g. of ammonium salt of perfluorooctanonic acid were charged into an autoclave made of stainless steel and having a volume of 5l. The air was removed by repeated solidifying and evacuating, and 1,450 g. of tetrafluoroethylene and 207 g. of propylene were charged, γ-rays from a source of cobalt 60 was irradiated to the mixture at 25°C. while stirring, at a dose rate of 3.3 × 10⁴ roentgens/hour for 10 hours. The pressure in the copolymerization reaction system was 28 – 30 kg/cm². As a result, 370 g. of a copolymer of tetrafluoroethylene and propylene, having 0.67 of intrinsic viscosity in tetrahydrofuran solution at 30°C., was obtained. The molecular weight of the copolymer was 78,000.

EXAMPLE 8

The emulsion copolymerization of Example 7 was repeated except irradiating γ-rays at 2 × 10⁴ roentgens/hour. A copolymer of tetrafluoroethylene and propylene having 0.77 of intrinsic viscosity in tetrahydrofuran solution at 30°C., and having 90,000 of molecular weight was obtained.

EXAMPLE 9

2.1 of water from which oxygen has been removed and 10 g. of ammonium salt of perfluorooctanonic acid were charged into an autoclave made of stainless steel and having a volume of 5l. The mixture of tetrafluoroethylene and propylene having 85:15 of molar ratio of TFE/PP was continuously charged to maintain 25 kg/cm² of pressure. γ-rays from a source of cobalt 60 was irradiated to the mixture at 25°C. while stirring, at a dose rate of 5 × 10⁴ roentgens/hour for 20 hours. 170 g. of a copolymer of tetrafluoroethylene and propylene having 0.65 of intrinsic viscosity in tetrahydrofuran at 30°C. was obtained. The molecular weight of the copolymer was 74,000.

EXAMPLE 10

Tetrafluoroethylene and propylene were copolymerized in the presence of 3.0 weight percent aqueous solution of ammonium salt of perfluorooctanonic acid, (oxygen was removed) in a 25 ml. ampoule. The molar ratio of tetrafluoroethylene and propylene was 75/25. γ-rays from a source of cobalt 60 was irradiated to the mixture at 5°C. while stirring, at a dose rate of 5 × 10⁴ roentgens/hour. A copolymer of tetrafluoroethylene and propylene having 0.65 of intrinsic viscosity in tetrahydrofuran was obtained. The molecular weight of the copolymer was 74,000.

Reference:

15 Mrad of γ-rays from a source of cobalt 60 was irradiated to a mixture of 100 parts by weight of a copolymer of tetrafluoroethylene and propylene and 25 parts by weight of FEF carbon (manufactured by Tokai Denkyoku Co., Ltd.) to yield a cross-linked polymer. As a result, a cross-linked copolymer having 158 kg/cm² of tensile strength and 263% of elongation was obtained.

Reference:

The copolymer of tetrafluoroethylene and propylene of Example 7 was press-vulcanized in the following formula at 160°C. for 60 minutes.

Formula:

|  | parts by weight |
|---|---|
| Copolymer | 100 |
| MgO | 5 |
| FEF Carbon | 25 |
| Peroxide | 4 |
| Triallylcyanurate | 3 |

As a result, a cross-linked copolymer having 120 kg/cm² tensile strength and 370 % elongation was obtained. When the resultant cross-linked copolymer was heated at 160°C. for 20 hours, the tensile strength was increased to 150 kg/cm².

The results of this invention have been compared with those obtained by Brasen et al U.S. Pat. No. 3,467,635 which describes a chemical initiated system, wherein the pressure at 35°– – C is about 22 – 170 kg/cm². The molecular weight of the product of Brasen et al was measured by inherent viscosity at 30°C as a solution of 1 g. of copolymer in 100 ml. of 1,1,2-trichloro-1,2,2-trifluoroethane. The maximum value was 1,086 (Example 5).

The molecular weight of the product of the present invention was calculated from the intrinsic viscosity and inherent viscosity data. It is clear as summarized in the following table that the molecular weight of the copolymer of the present invention is higher than that obtainable by the Brasen et al technique.

This invention:

|  | Intrinsic Viscosity | Inherent Viscosity |
|---|---|---|
| Example 1 | 0.44 | 1.24 |
| Example 2 | 0.41 | 1.19 |
| Example 3 | 0.54 | 1.36 |
| Example 4 | 0.82 | 1.57 |
| Example 7 | 0.67 | 1.49 |
| Example 8 | 0.77 | 1.54 |
| Example 9 | 0.65 | 1.48 |
| Example 10 | 0.65 | 1.48 |

Brasen et al:

|  | Intrinsic Viscosity | Inherent Viscosity |
|---|---|---|
| Example 3 | 0.32 | 1.0 |
| Example 4 | 0.14 | 0.49 |
| Example 5 | 0.35 | 1.086 |
| Example 7 | 0.38 | 1.12 |

Having now fully described the invention, it will be apparent to one of ordinary skill in the art that many changes and modifications can be made without departing from the spirit or scope of the invention.

What is claimed as new and intended to be covered by Letters Patent is:

1. A process for producing copolymer of tetrafluoroethylene and propylene which comprises copolymerizing tetrafluoroethylene and propylene with high energy ionizing radiation at a dose rate of $10^2 - 10^7$ roentgens/hour in an aqueous emulsion, without a hydrocarbon liquid, consisting essentially of water, tetrafluoroethylene and propylene and a dispersing agent which is suitable for emulsifying tetrafluoroethylene and propylene and has no retarding action for the copolymerization reaction, wherein the reaction temperature is 5° to 80°C. and reaction pressure is 1 to 50 kg/cm².

2. The process of claim 1, wherein the molar ratio of tetrafluoroethylene to propylene is 95/5 to 50/50.

3. The process of claim 1, wherein the dispersing agent is a perfluoro or perflurochloro dispersing agent.

4. The process of claim 1, wherein the amount of the dispersing agent is 0.001 – 5 percent by weight of the aqueous medium.

5. The process of claim 1, wherein the copolymer has an intrinsic viscosity, measured in a tetrahydrofuran solution (100 cc/g) at 30°C, of from 0.41 to 0.82.

6. The process of claim 1, wherein the total dose of radiation is from $10^2 - 10^8$ roentgens.

7. The process of claim 3, wherein the dispersing agent is selected from the groups consisting of water soluble salts of perfluoro aliphatic carboxylic acid, water soluble salts of phosphoric esters of perfluoro aliphatic alcohol, perfluorosulfates and perfluorochlorosulfates.

* * * * *